(12) United States Patent
Park et al.

(10) Patent No.: US 11,891,483 B2
(45) Date of Patent: Feb. 6, 2024

(54) POLYIMIDE FILM FOR DISPLAY SUBSTRATE

(71) Applicant: LG CHEM, LTD., Seoul (KR)

(72) Inventors: Jinyoung Park, Daejeon (KR); Cheolmin Yun, Daejeon (KR); Kyunghwan Kim, Daejeon (KR); Danbi Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 490 days.

(21) Appl. No.: 16/632,482

(22) PCT Filed: Jul. 20, 2018

(86) PCT No.: PCT/KR2018/008226
§ 371 (c)(1),
(2) Date: Jan. 20, 2020

(87) PCT Pub. No.: WO2019/103274
PCT Pub. Date: May 31, 2019

(65) Prior Publication Data
US 2020/0148826 A1    May 14, 2020

(30) Foreign Application Priority Data
Nov. 21, 2017 (KR) .................. 10-2017-0155408

(51) Int. Cl.
C08G 73/10    (2006.01)
C08J 5/18     (2006.01)

(52) U.S. Cl.
CPC ..... *C08G 73/1067* (2013.01); *C08G 73/1032* (2013.01); *C08G 73/1039* (2013.01); *C08G 73/1042* (2013.01); *C08J 5/18* (2013.01); *C08J 2379/08* (2013.01)

(58) Field of Classification Search
CPC ......... C08G 73/10; C08J 5/18; C08J 2479/08; Y10T 428/3172
See application file for complete search history.

(56) References Cited

U.S. PATENT DOCUMENTS

| | | | |
|---|---|---|---|
| 5,115,090 A | 5/1992 | Sachdev et al. | |
| 9,393,720 B2 | 7/2016 | Hisano et al. | |
| 9,556,311 B2 | 1/2017 | Sohn et al. | |
| 10,590,306 B2 | 3/2020 | Ashibe et al. | |
| 10,899,886 B2 | 1/2021 | Yun et al. | |
| 2010/0304298 A1* | 12/2010 | Hirashima | G03F 7/0045 430/319 |
| 2014/0024786 A1 | 1/2014 | Sohn et al. | |
| 2014/0356636 A1 | 12/2014 | Sun et al. | |
| 2016/0002407 A1* | 1/2016 | Wakita | H01L 51/52 528/188 |
| 2016/0251545 A1* | 9/2016 | Yun | C08G 73/1039 524/606 |
| 2017/0096530 A1 | 4/2017 | Yun et al. | |
| 2017/0137571 A1 | 5/2017 | Nakayama et al. | |
| 2017/0210854 A1* | 7/2017 | Matsuyama | C08G 73/1067 |
| 2019/0055428 A1* | 2/2019 | Ashibe | H01L 51/0097 |

FOREIGN PATENT DOCUMENTS

| | | |
|---|---|---|
| CN | 106133025 A | 11/2016 |
| CN | 106589415 A | 4/2017 |
| EP | 3486270 A1 | 5/2019 |
| JP | H04-224824 A | 8/1992 |
| JP | 2010-168517 A | 8/2010 |
| JP | 2016-011418 A | 1/2016 |
| JP | WO 2017068936 * | 4/2017 |
| JP | 2017-119868 A | 7/2017 |
| KR | 10-2012-0065349 A | 6/2012 |
| KR | 10-2014-0012270 A | 2/2014 |
| KR | 10-2015-0002251 A | 1/2015 |
| KR | 10-2016-0067413 A | 6/2016 |
| KR | 10-2016-0097685 A | 8/2016 |
| KR | 10-2017-0010383 A | 1/2017 |
| KR | 10-2017-0016384 A | 2/2017 |
| KR | 10-1796875 B1 | 11/2017 |
| TW | 201117962 A | 6/2011 |
| WO | 2017/068936 A1 | 4/2017 |

OTHER PUBLICATIONS

Extended European Search Report issued for European Patent Application No. 18882073.2 dated Dec. 8, 2020, 9 pages.
International Search Report issued for International Application No. PCT/KR2018/008226 dated Oct. 30, 2018, 6 pages.
Nam, et al., "Residual Stress Behavior and Physical Properties of Colorless and Transparent Polyimide Films", Polymer(Korea), 2014, vol. 38, No. 4, pp. 510-517.

* cited by examiner

*Primary Examiner* — Gregory Listvoyb
(74) *Attorney, Agent, or Firm* — ROTHWELL, FIGG, ERNST & MANBECK, P.C.

(57) ABSTRACT

The present invention relates to a polyimide film showing a low stress change rate on a silicon wafer. The present invention can minimize cracks which are formed due to the stress change of polyimide, in a process for depositing an inorganic film on a polyimide substrate at a high temperature, and thus can reduce electrical property degradation such as a recoverable residual image and decrease in current of a flexible display.

7 Claims, 2 Drawing Sheets

[FIG. 1]
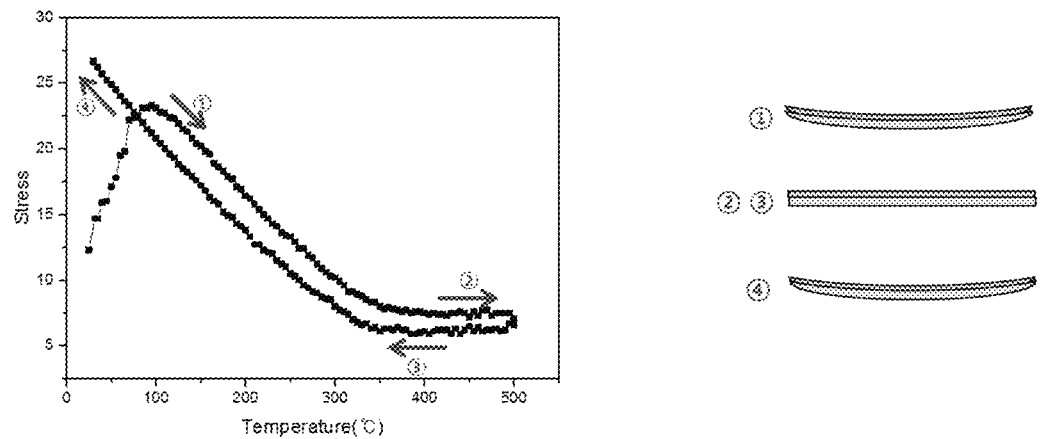
[FIG. 2]
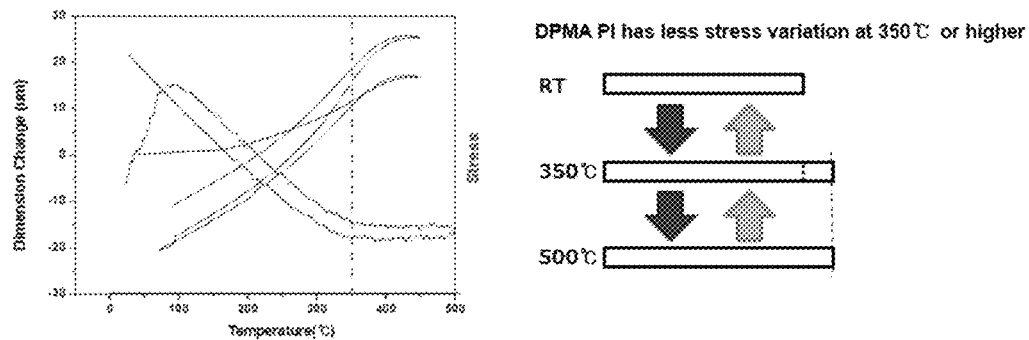
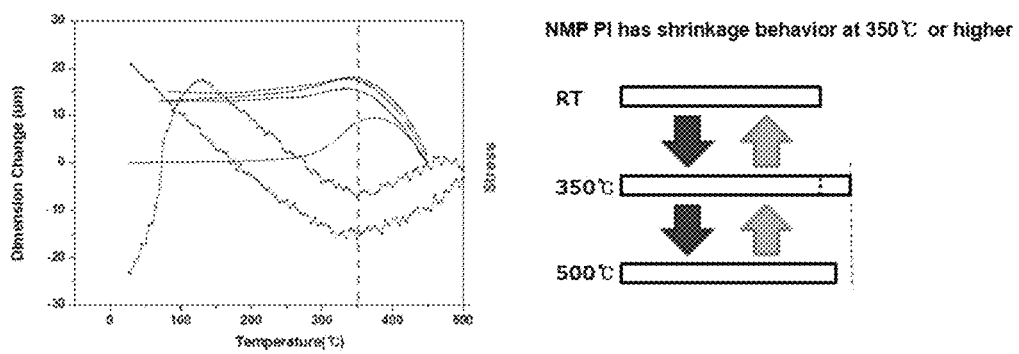

[FIG. 3]
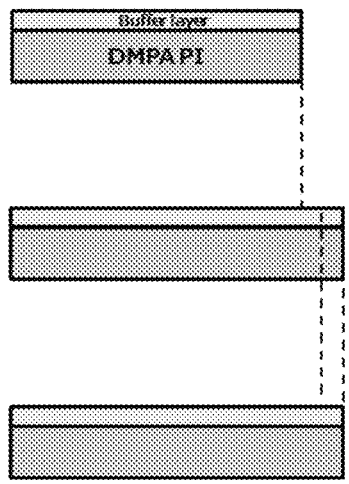
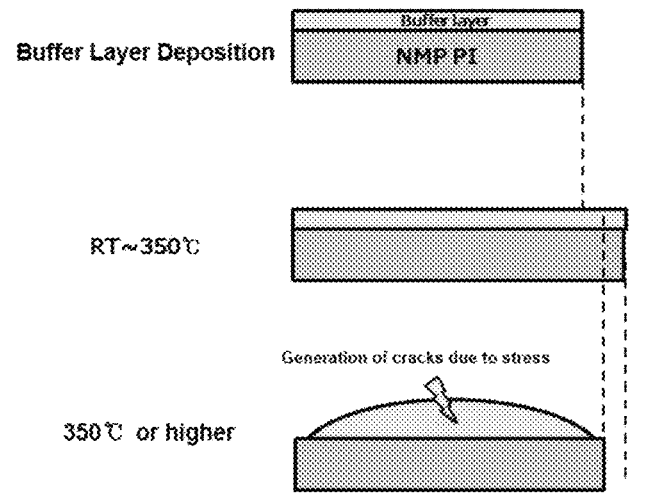

POLYIMIDE FILM FOR DISPLAY SUBSTRATE

This application is a 35 U.S.C. § 371 National Phase Entry Application from PCT/KR2018/008226, filed on Jul. 20, 2018, and designating the United States, which claims the benefit of priority to Korean Patent Application No. 10-2017-0155408, filed on Nov. 21, 2017, the entire disclosures of which are incorporated herein by reference.

The present invention relates to a polyimide film for a flexible display substrate, which can minimize the generation of cracks in an inorganic film layer being formed on a polyimide substrate during a TFT process.

TECHNICAL FIELD

Background of the Invention

Recent display devices have been focused on weight reduction and miniaturization thereof. For example, glass substrates used in the display devices have limits of being heavy and easily cracked difficult to be continuously processed, and have replaced with plastic substrates having advantages of being light, flexible and capable of continuous processing in devices such as mobile phones, notebook computers, PDAs, and the like.

In particular, polyimide (PI) resin has advantages that it is easy to synthesize, and it can be made in the form of a thin film and does not require a crosslinking group for curing. For these reasons, many researches have tried to use the PI in a flexible plastic display board having light and flexible properties as integrated materials for semiconductors of LCD, PDP and the like according to the trends of recent electronic products, such as lightweight and refinement.

Generally, the polyimide resin is prepared in the form of a film, specifically by solution polymerization of dianhydride and diamine or diisocyanate to obtain a solution of polyamic acid derivative and coating the solution on a silicon wafer or glass, followed by heat curing.

BRIEF SUMMARY OF THE INVENTION

The present invention is designed to solve the technical problem of the related art, and thus, it is an aspect of the present invention to provide a polyimide film which can minimize the generation of cracks in an inorganic film layer to be formed on the film.

It is other aspect of the present invention to provide a flexible display substrate prepared from the polyimide film.

In order to accomplish the above aspect, the present provides a polyimide film for a flexible display substrate, which has a thickness of 5 to 20 μm, and has a stress variation of 0 to 5 when it is subject to heating and cooling at a temperature ranging from 350 to 500° C. on a silicon wafer.

In one embodiment, the polyimide film may be prepared by using a solution comprising a polyimide precursor and an organic solvent having a positive value of Log P.

In one embodiment, the organic solvent having a positive value of Log P may be at least one selected from the group consisting of dimethylpropionamide (DMPA), diethylpropionamide (DEPA), N,N-diethylacetamide (DEAc), N,N-diethylformamide (DEF), and N-ethylpyrrolidone (NEP).

In one embodiment, the organic solvent having a positive value of Log P may have a density of 1 g/cm³ or less.

In one embodiment, the organic solvent having a positive value of Log P may have a vapor pressure of 0.5 Torr or more.

In one embodiment, the polyimide film may have a positive value of CTE at a temperature ranging from 350 to 500° C.

In one embodiment, the polyimide may comprise an end-capped polyimide which is prepared using a diamine, an acid dianhydride and an end-capper as polymerization components.

In one embodiment, the polyimide may have a repeat unit of following formula 6:

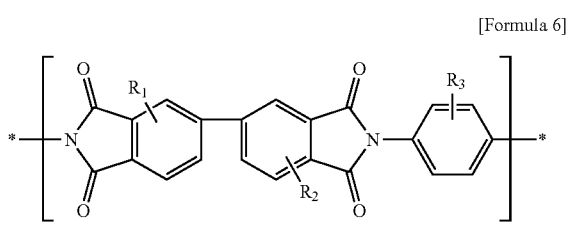

[Formula 6]

wherein, $R_1$, $R_2$ and $R_3$ are each independently selected from hydrogen atom, $C_{1-10}$ alkyl, $C_{1-10}$ fluoroalkyl, $C_{6-12}$ aryl, hydroxyl and carboxyl groups.

In one embodiment, the polyimide may further have a repeat unit of following formula 6a:

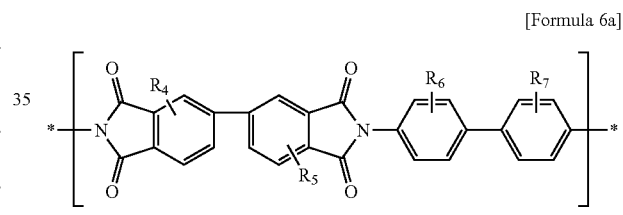

[Formula 6a]

wherein, $R_4$, $R_5$, $R_6$ and $R_7$ are each independently selected from hydrogen atom, $C_{1-10}$ alkyl, $C_{1-10}$ fluoroalkyl, $C_{6-12}$ aryl, hydroxyl and carboxyl groups.

In one embodiment, in formula 6a, $R_4$ and $R_5$ may be each independently hydrogen atom, and $R_6$ and $R_7$ are each independently $C_{1-10}$ fluoroalkyl.

The present invention further provides a flexible display substrate prepared from the polyimide film.

Advantageous Effects

The present invention provides a polyimide film whose stress variation is low at a high temperature when it is coated on a glass substrate. The polyimide film can minimize crack generation due to the deformation of an inorganic film caused from the stress variation of the polyimide film during a process of forming the inorganic film by deposition on the polyimide substrate, and thus it can reduce the recoverable residual image and the current decrease of a flexible display.

BRIEF DESCRIPTION OF THE DRAWINGS

FIG. 1 shows the results of residual stress measured for a film prepared in Example 1.

FIG. 2 shows the results of CTE variation and residual stress variation measured for films prepared in Example 1 and Comparative Example 1.

FIG. 3 schematically shows stress behavior according to the deposition of an inorganic film layer on films prepared in Example 1 and Comparative Example 1.

DETAILED DESCRIPTION OF THE INVENTION

Hereinafter, the present invention will be described in detail with reference to the accompanying drawings which illustrate a preferable example of the present invention for the purpose of better explanation, not intended to limit the technical scope of the invention. It will be obvious to those skilled in the art that various changes and modifications may be made without departing from the spirit and scope of the invention. In the following description, well-known functions or constructions would not be described in detail if they may obscure the point of the invention.

As used herein, all compounds or organic groups may be substituted or unsubstituted, unless otherwise specified. The term "substituted" means that at least one hydrogen contained in the compound or organic group is substituted with a halogen atom, an alkyl group having 1 to 10 carbon atoms, a halogenated alkyl group, a cycloalkyl group having 3 to 30 carbon atoms, an aryl group having 6 to 30 carbon atoms, an alkoxy group having 1 to 10 carbon atoms, a carboxyl group, an aldehyde group, an epoxy group, a cyano group, a nitro group, an amino group, and a derivative thereof.

Currently, displays have been prepared using plastic substrates to reduce the weight and thickness of glass substrates. Particularly, a display that applies an OLED device on a plastic substrate has advantages of being bent or folded, and is continuously being developed.

Such a flexible display device is prepared by forming a multi-layered inorganic film of a buffer layer, an active layer, and a gate insulator on a polyimide cured in the preparation of TFT devices. As the inorganic film, a silicon oxide film ($SiO_x$) or a silicon nitride film ($SiN_x$) is mainly used. It is generally known that the $SiO_x$ has a property of being compressive in a process and the $SiN_x$ has tensile property. Therefore, it needs to minimize the stress variation of a polyimide substrate when the polyimide substrate is subject to heating at a high temperature for the deposition of an inorganic film during the TFT process of the substrate, thereby minimizing the generation of cracks in the inorganic film due to the thermal deformation of the polyimide film on the formation of the inorganic film. These properties of the polyimide substrate are closely relevant to electrical properties regarding to the recoverable residual image and the current decrease of a flexible display in the preparation of a flexible OLED.

In order to solve the problem of the related art, the present invention provide a polyimide film for a flexible display substrate, which has a thickness of 5 to 20 μm, and has a stress variation of 0 to 5 when it is subject to heating and cooling at a temperature ranging from 350 to 500° C. on a silicon wafer.

The present invention uses the polyimide film having a stress variation of 0 to 5 in the range of 350 to 500° C. to minimize the change of the polyimide by stress during a high-temperature process for deposition of an inorganic film, thereby inhibiting bending phenomenon generated in the deposition of the inorganic film on the polyimide film and reducing the occurrence of stress reversal.

In one embodiment, the polyimide film may have a thickness of 5 to 10 μm, and have a stress variation of 0 to 3 at a temperature ranging from 350 to 500° C.

If the polyimide film has excessive stress variation by heat shrinkage, the occurrence of stress reversal with the inorganic film layer may increase to generate cracks in the inorganic film. For this reason, it is preferable that the polyimide film has a stress variation of 0 to 3.

Also, the polyimide film according to the present invention may have a positive value of CTE (coefficient of thermal expansion) at a temperature ranging from 350 to 500° C. For example, the value of CTE may range from 0 to 10 ppm/° C., preferably from 0 to 5 ppm/° C. This represents that the polyimide film according to the present invention does not undergo shrinkage at a high temperature as described above, thereby inhibiting the bending of the polyimide by heat shrinkage and then the occurrence of stress reversal.

Thus, the polyimide film according to the present invention has a low stress variation and a positive CTE value in a high-temperature process, thereby reducing the occurrence of stress reversal with the inorganic film layer due to residual stress in the process of depositing the inorganic film and then minimizing the generation of cracks due to such residual stress in the inorganic film layer. That is, in the deposition of $SiO_x$ or $SiN_x$ layer for the preparation of a TFT device, it is possible to minimize the generation of cracks due to stress reversal of the polyimide with the $SiO_x$ layer and reduce recoverable residual image and current decrease, which may be caused by the cracks, in the TFT device of a flexible display.

The organic solvent used in the polymerization of a polyimide precursor according to the present invention may have a positive value of partition coefficient (Log P).

The organic solvent may have a positive partition coefficient (Log P) at 25° C. and a boiling point of 180° C. or less. More preferably, the value of partition coefficient (Log P) may range from 0.01 to 3, or from 0.01 to 2.

The partition coefficient may be calculated using the ACD/Log P module of ACD/Percepta platform (ACD/Labs). The ACD/Log P module uses an algorism for quantitative structure-property relationship (QSPR) based on molecular 2D structure.

The solvent having a positive partition coefficient (Log P) may be amide-based solvents, which may be at least one selected from the group consisting of dimethylpropionamide (DMPA), diethylpropionamide (DEPA), N,N-diethylacetamide (DEAc), N,N-diethylformamide (DEF), and N-ethylpyrrolidone (NEP). Among these, dimethylpropionamide (DMPA) or diethylpropionamide (DEPA) is most preferable in term of relatively low polarity and low boiling point to provide good coating property, as well as superior volatility at a low temperature, which can lower the amount of the solvent remained in the film after film formation.

The positive value of partition coefficient means the hydrophobic polarity of a solvent. The present inventors have found that when a certain solvent having a positive partition coefficient is used to prepare a polyimide precursor composition, it can improve the drying property of the solvent. Also, the use of a solvent having a positive partition coefficient can control the drying property of the solvent without using an additive such as a leveling agent for controlling the surface tension and the smoothness of the coated film. By avoiding the use of additional additive, it is possible not only to eliminate the problems that a low molecular weight material is contained in the final product to cause quality damage and process difficulty, but also to have the effect of forming a polyimide having uniform properties more effectively.

For example, in the process coating the polyimide precursor composition on a glass substrate, the coating solution may be dewetted due to shrinkage of the coated layer when the coating solution is cured or stored under humidity conditions. The liquid curling phenomenon of the coating solution may cause a variation in the thickness of the film, thereby resulting in a phenomenon in which the film is broken or the edges are broken when cutting due to the lack of bending resistance of the film, resulting in the problems of poor workability and lower yield.

Also, when a fine polar foreign material may be introduced into the polyimide precursor composition coated on the substrate, the polyimide precursor composition comprising a polar solvent with a negative value of Log P may sporadically undergo crack generation or thickness change based on the position of the foreign material by the polarity of the foreign material in the coated film, while the polyimide precursor composition comprising a hydrophobic solvent with a positive value of Log P can alleviate or inhibit crack generation and thickness change even though the fine polar foreign material is introduced.

Specifically, the polyimide precursor composition comprising a solvent with a positive value of Log P may have a dewetting ratio of 0% to 0.1% as defined by the following Equation 2:

Dewetting ratio (%)=[(A−B)/A]×100    [Equation 2]

wherein,

A is the area of the polyimide precursor composition in the state that the polyimide precursor composition was completely coated on the substrate (100 mm×100 mm), B is the area of the polyimide precursor composition or the polyimide (PI) film after the polyimide precursor composition or the polyimide film is dewetted from the end of the coated substrate.

Dewetting phenomenon in polyimide precursor composition or film may occur within 30 minutes after coating of the polyimide precursor composition. Particularly, as Dewetting is started from the edge, the thickness of the edge may increase.

After the polyimide precursor composition according to the present invention is coated on a substrate and then stored for 10 minutes or longer, for example, 10 minutes or longer, for example, 40 minutes or longer under a humid condition, dewetting ratio of the coated polyimide precursor composition may be 0.1% or less. For example, even after storing at a temperature of 20° C. to 30° C. and under a humidity condition of 40% or more, more specifically, under a humidity condition of a range from 40% to 80%, i.e., 40%, 50%, 60%, 70% and 80%, respectively, for example, 50%, for 10 to 50 minutes, dewetting ratio may be very low as 0.1% or less, preferably 0.05%, more preferably near 0%.

Such dewetting ratio is also maintained after curing. For example, after the polyimide precursor composition is coated on a substrate, storing thereof for 10 minutes or longer, for example, at a temperature of 20° C. to 30° C. and under a humidity condition of 40% or more, more specifically, under a humidity condition of a range from 40% to 80%, i.e., 40%, 50%, 60%, 70% and 80%, respectively, for example, storing under a humidity condition of 50% for 10 to 50 minutes and then cured, dewetting ratio of the polyimide film thus obtained may be 0.1% or less. In other word, there may be little or no dewetting in the curing process by heat-treatment, and specifically, the dewetting ratio may be 0.05%, more preferably near 0%.

The polyimide precursor composition according to the present invention can solve the dewetting phenomenon, thereby providing a polyimide with more uniform characteristics and thus improving the yield of a manufacturing process.

Further, the density of the organic solvent according to the present invention may be measured by a standard measuring method of ASTM D1475, and it may be 1 g/cm$^3$ or less. If the density is more than 1 g/cm$^3$, the relative viscosity may increase and then the process efficiency may be reduced.

Also, the vapor pressure of the organic solvent may be 0.5 Torr or more. When the vapor pressure is 0.5 Torr or more, it can enhance volatility at a low temperature to lower the amount of the solvent remained in the film after film formation, which is preferable for the formation of a film.

In one embodiment, the polyimide may have a repeat unit of following formula 1:

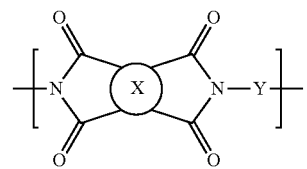

[Formula 1]

wherein,

X is selected from aromatic, alicyclic, and aliphatic tetravalent organic groups derived from tetracarboxylic dianhydrides, and Y is selected from aromatic, alicyclic, and aliphatic divalent organic groups derived from diamines.

In one embodiment, the polyimide may have a repeat unit of following formula 1a:

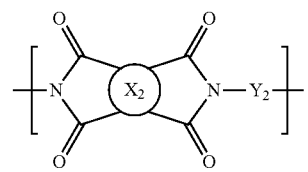

[Formula 1a]

wherein, $X_2$ is selected from aromatic, alicyclic, and aliphatic tetravalent organic groups derived from tetracarboxylic dianhydrides, and $Y_2$ is selected from aromatic, alicyclic, and aliphatic divalent organic groups derived from diamines.

The X and $X_2$ are each independently a tetravalent organic group selected from the group consisting of the following formulas 2a to 2g:

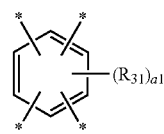

[Formula 2a]

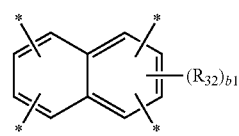

[Formula 2b]

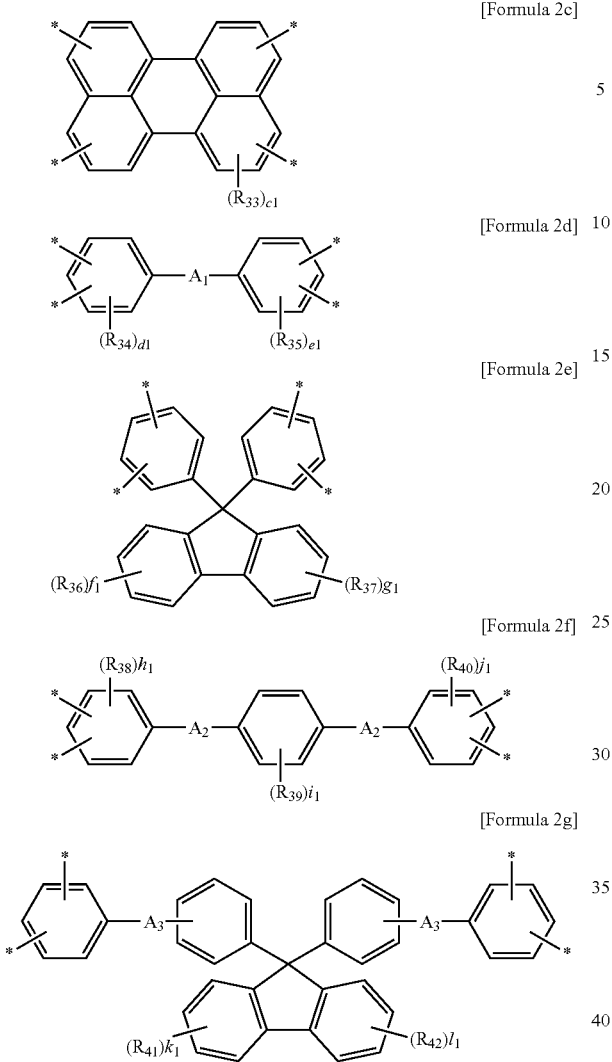

[Formula 2c]

[Formula 2d]

[Formula 2e]

[Formula 2f]

[Formula 2g]

wherein, $R_{31}$ to $R_{42}$ are each independently $C_{1-10}$ alkyl (e.g., a methyl, ethyl, propyl, isopropyl, t-butyl, pentyl or hexyl group), or $C_{1-10}$ fluoroalkyl (e.g., a fluoromethyl, perfluoroethyl or trifluoromethyl group), $a_1$ is an integer of 0 to 2, $b_1$ is an integer of 0 to 4, $c_1$ is an integer of 0 to 8, $d_1$ and $e_1$ are each independently an integer of 0 to 3, $f_1$ and $g_1$ are each independently an integer of 0 to 4, $h_1$ and $j_1$ are each independently an integer of 0 to 3, $i_1$ is an integer of 0 to 4, $k_1$ and $l_1$ are each independently an integer of 0 to 4, $A_1$, $A_2$ and $A_3$ are each independently selected from the group consisting of a single bond, —O—, —$CR_{46}R_{47}$—, —C(=O)—, —C(=O)O—, —C(=O)NH—, —S—, —$SO_2$—, phenylene and a mixture thereof, in which $R_{46}$ and $R_{47}$ are each independently selected from the group consisting of hydrogen, $C_{1-10}$ alkyl (e.g., a methyl, ethyl, propyl, isopropyl, t-butyl, pentyl or hexyl group), or $C_{1-10}$ fluoroalkyl (e.g., a fluoromethyl, perfluoroethyl or trifluoromethyl group), Also, the X and $X_2$ are each independently a tetravalent organic group selected from the group consisting of the following formulas 3a to 3k:

(3a)

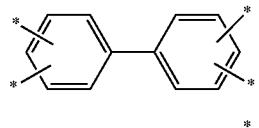
(3b)

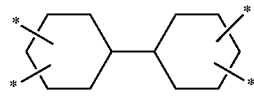
(3c)

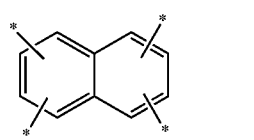
(3d)

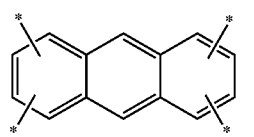
(3e)

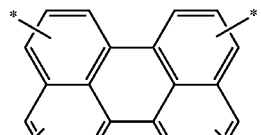
(3f)

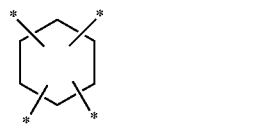
(3g)

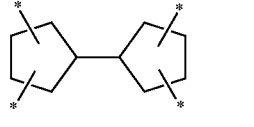
(3h)

(3i)

(3j)

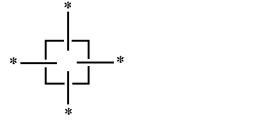
(3k)

At least one hydrogen atom present in each of the tetravalent aromatic organic groups of Formulas 3a to 3k may also be substituted with a substituent selected from the group consisting of $C_{1-10}$ alkyl (e.g., a methyl, ethyl, propyl, isopropyl, t-butyl, pentyl or hexyl group), $C_{1-10}$ fluoroalkyl (e.g., a fluoromethyl, perfluoroethyl or trifluoromethyl group), hydroxyl and carboxyl.

The Y and $Y_2$ are each independently a divalent organic group selected from the group consisting of the following formulas 4a to 4d:

[Formula 4a]

[Formula 4b]

wherein, $L_1$ is a single bond, —O—, —CO—, —S—, —$SO_2$—, —$C(CH_3)_2$—, —$C(CF_3)_2$—, —CONH—, —COO—, —$(CH_2)_{n_1}$-, —$O(CH_2)_{n_2}O$—, —$OCH_2$—$C(CH_3)_2$—$CH_2O$— or —$COO(CH_2)_{n_3}OCO$—, in which $n_1$, $n_2$ and $n_3$ are each an integer of 1 to 10.

[Formula 4c]

wherein, $L_2$ and $L_3$ are same or different with each other, and are each a single bond, —O—, —CO—, —S—, —$SO_2$—, —$C(CH_3)_2$—, —$C(CF_3)_2$—, —CONH—, —COO—, —$(CH_2)_{n_1}$-, —$O(CH_2)_{n_2}O$—, —$OCH_2$—$C(CH_3)_2$—$CH_2O$— or —$COO(CH_2)_{n_3}OCO$—, in which $n_1$, $n_2$ and $n_3$ are each an integer of 1 to 10.

[Formula 4d]

wherein, $L_4$, $L_5$ and $L_6$ are same or different with each other, and are each a single bond, —O—, —CO—, —S—, —$SO_2$—, —$C(CH_3)_2$—, —$C(CF_3)_2$—, —CONH—, —COO—, —$(CH_2)_{n_1}$-, —$O(CH_2)_{n_2}O$—, —$OCH_2$—$C(CH_3)_2$—$CH_2O$— or —$COO(CH_2)_{n_3}OCO$—, in which $n_1$, $n_2$ and $n_3$ are each an integer of 1 to 10.

Also, the Y and $Y_2$ are each independently a divalent organic group selected from the group consisting of the following formulas 5a to 5k:

(5a)

(5b)

(5c)

(5d)

(5e)

(5f)

(5g)

(5h)

(5i)

(5j)

(5k)

At least one hydrogen atom present in each of the divalent aromatic organic groups of Formulas 5a to 5k may also be substituted with a substituent selected from the group consisting of $C_{1-10}$ alkyl (e.g., a methyl, ethyl, propyl, isopropyl, t-butyl, pentyl or hexyl group), $C_{1-10}$ fluoroalkyl (e.g., a fluoromethyl, perfluoroethyl or trifluoromethyl group), $C_{6-12}$ aryl (e.g., phenyl or naphthyl), hydroxyl and carboxyl.

The polyimide of Formulas 1 and 1a may be prepared by polymerization of a tetracarboxylic dianhydride and a diamine. The acid dianhydride and the diamine may be used in a molar ratio of 0.95:1 to 1:0.95, preferably 0.98:1 to 1:0.98, or 0.99:1 to 1:0.99.

In one embodiment, the polyimide may have a repeat unit of following formula 6:

[Formula 6]

In one embodiment, the polyimide may further have a repeat unit of following formula 6a:

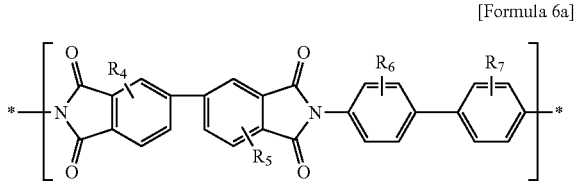

[Formula 6a]

In Formulas 6 and 6a, $R_1$, $R_2$, $R_3$, $R_4$, $R_5$, $R_6$ and $R_7$ are each independently selected from hydrogen atom, $C_{1-10}$ alkyl (e.g., a methyl, ethyl, propyl, isopropyl, t-butyl, pentyl or hexyl group), $C_{1-10}$ fluoroalkyl (e.g., a fluoromethyl, perfluoroethyl or trifluoromethyl group), $C_{6-12}$ aryl (e.g., phenyl or naphthyl), hydroxyl and carboxyl groups.

Also, when the polyamic acid or the polyimide of the present invention is synthesized, excess polyamino groups or acid anhydride groups need to be inactivated. To this end, a dicarboxylic anhydride or a monoamine may be further added as an end-capping agent to cap the ends of the polyimide. The polyimide is preferably end-capped with a dicarboxylic anhydride so as to improve heat resistance.

The end-capping agent is used in an amount of 1 to 5 mol %, preferably 1 to 3 mol %, based on 100 mol of the total tetracarboxylic dianhydride or the total diamine.

Examples of dicarboxylic anhydrides suitable for end-capping the polyimide or the polyamic acid include phthalic anhydride, 2,3-benzophenonedicarboxylic anhydride, 3,4-benzophenonedicarboxylic anhydride, 2,3-dicarboxyphenyl phenyl ether anhydride, 2,3-biphenyldicarboxylic anhydride, 3,4-biphenyldicarboxylic anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride, and 1,9-anthracenedicarboxylic anhydride. These dicarboxylic anhydrides may have a group unreactive with amines or dicarboxylic anhydrides in their molecules.

Examples of monoamines suitable for end-capping the polyimide or the polyamic acid include aniline, o-toluidine, m-toluidine, p-toluidine, 2,3-xylidine, 2,4-xylidine, 2,5-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-aminophenol, m-aminophenol, p-aminophenol, o-anilidine, m-anilidine, p-anilidine, o-phenetidine, m-phenetidine, p-phenetidine, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophenyl phenyl ether, 2-aminobenzophenone, 3-aminobenzophenone, 4-aminobenzophenone, α-naphthylamine, β-naphthylamine, 1-amino-2-naphthol, 2-amino-1-naphthol, 4-amino-1-naphthol, 5-amino-1-naphthol, 5-amino-1-naphthol, 5-amino-2-naphthol, 7-amino-2-naphthol, 8-amino-2-naphthol, 1-aminoanthracene, 2-aminoanthracene, and 9-aminoanthracene. These monoamines may have a group unreactive with amines or dicarboxylic anhydrides in their molecules.

Also, the further end-capping of the resulting polyimide may be carried out by adding the end-capping agent for continuous reaction after the reaction of the tetracarboxylic dianhydride and the diamine, by adding the tetracarboxylic dianhydride for continuous reaction after the reaction of adding a dicarboxylic anhydride-based end-capping agent to the diamine, by adding the diamine for continuous reaction after the reaction of adding a diamine-based end-capping agent to the tetracarboxylic dianhydride, or by simultaneously adding the tetracarboxylic dianhydride, the diamine and the end-capping agent.

The end-capping agent is used in an amount of 20 parts by weight or less, preferably 1 to 10 parts by weight, more preferably 1 to 5 parts by weight, based on 100 parts weight of the sum of the tetracarboxylic dianhydride and the diamine.

The polymerization of the acid dianhydride and the diamine may be carried out by conventional polymerization methods of a polyimide or its precursor, such as solution polymerization.

The reaction of polymerization may be carried out under anhydrous conditions at a temperature of −75 to 50° C., preferably 0 to 40° C. The diamine compound is dissolved in an organic solvent, to which an acid dianhydride is added. The diamine compound and the acid dianhydride is contained in an amount of about 10 to 30 wt % in the polymerization solvent, and their molecular weight may be controlled according to the polymerization time and reaction temperature.

The polyimide precursor composition obtained by the above method may be coated on one surface of a substrate, followed by imidization, curing and separation from the substrate, to prepare a polyimide film.

Specifically, the polyimide precursor composition obtained by the above method may be in the form of a solution that the polyimide precursor is dissolved in the organic solvent. For example, in the case that the polyimide precursor is synthesized in the organic solvent, the polyimide precursor composition may be the polyimide precursor solution itself obtained after polymerization, may be further added with the same solution, or may be diluted with another solvent after polymerization.

The polyimide precursor composition preferably has a solid content to provide a suitable viscosity taking into consideration of processability such as coating property in the formation of a film. The solid content may range from 5 to 20 wt % based on the total weight of the polyimide precursor composition. It is preferred that the polyimide precursor composition has a viscosity of 400 to 50,000 cP. Also, the viscosity of the polyimide precursor composition may be less than 400 cP. If the viscosity of the polyimide precursor composition exceeds 50,000 cP, the flexibility thereof decreases, making it difficult to be uniformly coated on the substrate and causing the process problems in the preparation of a display substrate.

After coating of the polyimide precursor composition on one surface of the substrate, it is subject to heat-treatment and separation from the substrate to prepare a polyimide film.

The substrate may be glass, a metallic substrate or a plastic substrate, but is not particularly limited thereto. Among these, the glass may be preferably used in term that it has good thermal and chemical stability during the imidization and curing of the polyimide precursor and it can be easily separated from the polyimide film obtained after curing without any damage.

The coating procedure may be carried out by conventional methods, specifically spin coating, bar coating, roll coating, air-knife coating, gravure coating, reverse roll coating, kiss-roll coating, doctor blade coating, spray coating, dip coating or brush coating. Particularly, casting coating may be preferable in terms that it allows continuous processes and can increase the imidization rate of the polyimide film.

Also, the polyimide composition may be coated in a thickness so that the final polyimide film can have a thickness suitable for a display substrate.

Specifically, it may be coated in an amount that the final polyimide film can have a thickness of 10 to 30 μm, preferably 10 to 20 μm.

After coating of the polyimide precursor composition, a process of drying may be selectively carried out to remove the solvent remained in the polyimide precursor composition prior to heat-treatment.

The process of drying may be carried out by conventional methods, specifically at a temperature of 140° C. or less, or 80° C. to 140° C. The drying temperature of lower than 80° C. may increase the process time, and the drying temperature of higher than 140° C. may induce sudden imidization, making it difficult to obtain the uniform thickness of the polyimide film.

Subsequently, the heat-treatment may be carried out at a temperature of 450° C. or more.

Also, the heat-treatment may be carried out in multiple stages at 200° C. to 500° C. For example, the heat treatment may be carried out once at a temperature of 450° C. or higher, or may be carried out in multiple stages at least twice. When the heat treatment is carried out in two or more stages, the final heat treatment temperature may be 450° C. or higher.

Then, the polyimide film formed on the substrate may be detached from the substrate by conventional methods to prepare the polyimide film.

The present invention further provides a flexible display substrate prepared from the polyimide film.

The use of the polyimide film as a display substrate can inhibit reliability deterioration such as bending and lifting of coatings which may be generated in a high-temperature process for providing a device on the display substrate, and can inhibit the generation of cracks in a $SiO_x$ layer during the TFT process at a high-temperature. As a result, it can improve electrical properties regarding to the recoverable residual image and the current decrease, thereby providing more reliable device. Accordingly, the polyimide can be effectively used in the preparation of a flexible display applied in electronic devices such as an OLED, an LCD, an electronic paper or a solar cell, particularly as a substrate for displays such as an OLED.

Hereinafter, the present invention will be described in more detail with reference to Examples. It will be apparent to those skilled in the art that the following examples are intended to be illustrative of the present invention and not to be construed as limiting the scope of the invention.

<Solvent>

The properties of DMPA, DEPA, DMAc, DEAc and NMP were shown in Table 1.

Example 1: Preparation of s-BPDA-pPDA (98.9:100) Polyimide Precursor

A reactor subjected to nitrogen gas flow was filled with 100 g of organic solvent, N,N-dimethylpropionamide (DMPA), and then 6.243 g (57.726 mmol) of p-phenylene diamine (p-PDA) was dissolved therein while maintaining the temperature of the reactor at 25° C. To the solution of p-PDA, 16.797 g (57.091 mmol) of 3,3',4,4'-biphenylcarboxylic dianhydride (s-BPDA) and 56.96 g of DMPA were added at the same temperature, and dissolved with stirring for a predetermined period of time, to obtain a polyimide precursor.

The above organic solvent was added to the polyimide precursor obtained above so that its solid content was 12.8 wt %, thereby preparing a polyimide precursor solution.

Example 2: Preparation of s-BPDA-DPDA/PA (98.9:100:2.2) Polyimide Precursor

A reactor subjected to nitrogen gas flow was filled with 100 g of organic solvent, DMPA, and then 6.192 g (57.259 mmol) of p-phenylene diamine (p-PDA) was dissolved therein while maintaining the temperature of the reactor at 25° C. To the solution of p-PDA, 16.661 g (56.629 mmol) of 3,3',4,4'-biphenylcarboxylic dianhydride (s-BPDA) and 56.96 g of DMPA were added at the same temperature, and dissolved with stirring for the prescribed time to polymerize a polyamic acid. Thereto, 0.187 g (1.260 mmol) of phthalic anhydride (PA) was added and stirred for the predetermined time to obtain a polyimide precursor.

The above organic solvent was added to the polyimide precursor obtained above so that its solid content was 12.8 wt %, thereby preparing a polyimide precursor solution.

Example 3: Preparation of s-BPDA-DPDA/TFMB (98.9:95:5) Polyimide Precursor

A reactor subjected to nitrogen gas flow was filled with 100 g of organic solvent, DMPA, and 5.777 g (53.421 mmol) of p-phenylene diamine (p-PDA) and then 0.900 g (2.812 mmol) of bis(trifluoromethyl)benzidine (TFMB) were dissolved therein while maintaining the temperature of the reactor at 25° C. To the solution of p-PDA and TFMB, 16.363 g (55.614 mmol) of 3,3',4,4'-biphenylcarboxylic dianhydride (s-BPDA) and 56.96 g of DMPA were added at the same temperature, and dissolved with stirring for the

TABLE 1

| | DMPA | DEPA | DMAc | DEAc | NMP |
|---|---|---|---|---|---|
| bp(° C.) | 175 | 194 | 166 | 185 | 202 |
| Flash point | 65.8 ± 9.65 | 73.6 ± 9.65 | 63.8 ± 9.6 | 69.3 ± 9.6 | 86.1 ± 0.0 |
| Pka | −0.41 ± 0.70 | −0.41 ± 0.70 | −0.41 ± 0.70 | −0.41 ± 0.70 | −0.41 ± 0.20 |
| Density (g/cm$^3$) | 0.876 ± 0.06 | 0.870 ± 0.06 | 0.880 ± 0.06 | 0.872 ± 0.06 | 1.029 ± 0.06 |
| LogP | 0.256 ± 0.249 | 1.275 ± 0.249 | −0.253 ± 0.249 | 0.776 ± 0.249 | −0.637 ± 0.349 |
| Vapor Pressure (Torr) | 1.12 | 0.444 | 1.81 | 0.695 | 0.299 |
| Surface tension (mN/m) | 26.4 | — | 25.3 | 27.3 | 41 |

DMPA: N,N-dimethylpropionamide
DEPA: N,N- diethylpropionamide
DMAc: Dimethylacetamide
DEAc: Diethylacetamide
NMP: 1-Methyl-2-pyrrolidone prescribed time to polymerize a polyamic acid. After stirring for the predetermined time, a polyimide precursor was obtained.

The above organic solvent was added to the polyimide precursor obtained above so that its solid content was 12.8 wt %, thereby preparing a polyimide precursor solution.

Example 4: Preparation of s-BPDA-DPDA/TFMB (98.9:90:10) Polyimide Precursor

A reactor subjected to nitrogen gas flow was filled with 100 g of organic solvent, DMPA, and then 5.335 g (49.332 mmol) of p-phenylene diamine (p-PDA) and 1.775 g (5.481 mmol) of bis(trifluoromethyl)benzidine (TFMB) were dissolved therein while maintaining the temperature of the reactor at 25° C. To the solution of p-PDA and TFMB, 15.950 g (54.221 mmol) of 3,3',4,4'-biphenylcarboxylic dianhydride (s-BPDA) and 56.96 g of DMPA were added at the same temperature, and dissolved with stirring for the prescribed time to polymerize a polyamic acid. After stirring for the predetermined time, a polyimide precursor was obtained.

The above organic solvent was added to the polyimide precursor obtained above so that its solid content was 12.8 wt %, thereby preparing a polyimide precursor solution.

Example 5: Preparation of s-BPDA-pPDA/TFMB/PA (98.9:95:5:2.2)

Polyimide Precursor

A reactor subjected to nitrogen gas flow was filled with 100 g of organic solvent, DMPA, and then 5.731 g (52.999 mmol) of p-phenylene diamine (p-PDA) and 0.893 g (2.789 mmol) of bis(trifluoromethyl)benzidine (TFMB) were dissolved therein while maintaining the temperature of the reactor at 25° C. To the solution of p-PDA and TFMB, 16.234 g (55.175 mmol) of 3,3',4,4'-biphenylcarboxylic dianhydride (s-BPDA) and 56.96 g of DMPA were added at the same temperature, and dissolved with stirring for the prescribed time to polymerize a polyamic acid. Thereto, 0.182 g (1.227 mmol) of phthalic anhydride (PA) was added and stirred for the predetermined time to obtain a polyimide precursor.

The above organic solvent was added to the polyimide precursor obtained above so that its solid content was 12.8 wt %, thereby preparing a polyimide precursor solution.

Example 6: Preparation of s-BPDA-DPDA/TFMB/PA (98.9:90:10:2.2) Polyimide Precursor A reactor subjected to nitrogen gas flow was filled with 100 g of organic solvent, DMPA, and then 5.294 g (48.953 mmol) of p-phenylene diamine (p-PDA) and 1.742 g (5.439 mmol) of bis(trifluoromethyl)benzidine (TFMB) were dissolved therein while maintaining the temperature of the reactor at 25° C. To the solution of p-PDA and TFMB, 15.827 g (53.794 mmol) of 3,3',4,4'-biphenylcarboxylic dianhydride (s-BPDA) and 56.96 g of DMPA were added at the same temperature, and dissolved with stirring for the prescribed time to polymerize a polyamic acid. Thereto, 0.177 g (1.197 mmol) of phthalic anhydride (PA) was added and stirred for the predetermined time to obtain a polyimide precursor.

The above organic solvent was added to the polyimide precursor obtained above so that its solid content was 12.8 wt %, thereby preparing a polyimide precursor solution.

Comparative Example 1: Preparation of s-BPDA-DPDA (98.9:100) Polyimide Precursor A reactor subjected to nitrogen gas flow was filled with 100 g of organic solvent, N-methyl-2-pyrrolidone (NMP), and then 6.243 g (57.726 mmol) of p-phenylene diamine (p-PDA) was dissolved therein while maintaining the temperature of the reactor at 25° C. To the solution of p-PDA, 16.797 g (57.091 mmol) of 3,3',4,4'-biphenylcarboxylic dianhydride (s-BPDA) and 56.96 g of NMP were added at the same temperature, and dissolved with stirring for the predetermined time to obtain a polyimide precursor.

The above organic solvent was added to the polyimide precursor obtained above so that its solid content was 12.8 wt %, thereby preparing a polyimide precursor solution.

Comparative Example 2: Preparation of s-BPDA-DPDA/TFMB (98.9:95:5) Polyimide Precursor A reactor subjected to nitrogen gas flow was filled with 100 g of organic solvent, N-methyl-2-pyrrolidone (NMP), and then 5.777 g (53.421 mmol) of p-phenylene diamine (p-PDA) and 0.900 g (2.812 mmol) of bis(trifluoromethyl) benzidine (TFMB) were dissolved therein while maintaining the temperature of the reactor at 25° C. To the solution of p-PDA and TFMB, 16.363 g (55.614 mmol) of 3,3',4,4'-biphenylcarboxylic dianhydride (s-BPDA) and 56.96 g of NMP were added at the same temperature, and dissolved with stirring for the predetermined time to polymerize a polyamic acid. After stirring for the prescribed time, a polyimide precursor was obtained.

The above organic solvent was added to the polyimide precursor obtained above so that its solid content was 12.8 wt %, thereby preparing a polyimide precursor solution.

Comparative Example 3: Preparation of s-BPDA-pPDA/TFMB (98.9:90:10) Polyimide Precursor A reactor subjected to nitrogen gas flow was filled with 100 g of organic solvent, N-methyl-2-pyrrolidone (NMP), and 5.335 g (49.332 mmol) of p-phenylene diamine (p-PDA) and 1.775 g (5.481 mmol) of bis(trifluoromethyl) benzidine (TFMB) were dissolved therein while maintaining the temperature of the reactor at 25° C. To the solution of p-PDA and TFMB, 15.950 g (54.221 mmol) of 3,3',4,4'-biphenylcarboxylic dianhydride (s-BPDA) and 56.96 g of NMP were added at the same temperature, and dissolved with stirring for the prescribed time to polymerize a polyamic acid. After stirring for the predetermined time, a polyimide precursor was obtained.

The above organic solvent was added to the polyimide precursor obtained above so that its solid content was 12.8 wt %, thereby preparing a polyimide precursor solution.

Comparative Example 4: Preparation of s-BPDA-pPDA/TFMB/PA (98.9:95:5:2.2) Polyimide Precursor A reactor subjected to nitrogen gas flow was filled with 100 g of organic solvent, N-methyl-2-pyrrolidone (NMP), and then 5.731 g (52.999 mmol) of p-phenylene diamine (p-PDA) and 0.893 g (2.780 mmol) of bis(trifluoromethyl) benzidine (TFMB) were dissolved therein while maintaining the temperature of the reactor at 25° C. To the solution of p-PDA and TFMB, 16.234 g (55.175 mmol) of 3,3',4,4'- biphenylcarboxylic dianhydride (s-BPDA) and 56.96 g of NMP were added at the same temperature, and dissolved with stirring for the prescribed time to polymerize a polyamic acid. Thereto, 0.182 g (1.227 mmol) of phthalic anhydride (PA) was added and stirred for the predetermined time to obtain a polyimide precursor.

The above organic solvent was added to the polyimide precursor obtained above so that its solid content was 12.8 wt %, thereby preparing a polyimide precursor solution.

Comparative Example 5: Preparation of s-BPDA-pPDA/TFMB/PA (98.9:90:10:2.2) Polyimide Precursor A reactor subjected to nitrogen gas flow was filled with 100 g of organic solvent, N-methyl-2-pyrrolidone (NMP), and then 5.294 g (48.953 mmol) of p-phenylene diamine (p-PDA) and 1.742 g (5.439 mmol) of bis(trifluoromethyl) benzidine (TFMB) were dissolved while maintaining the temperature of the reactor at 25° C. To the solution of p-PDA and TFMB, 15.827 g (53.794 mmol) of 3,3',4,4'-biphenylcarboxylic dianhydride (s-BPDA) and 56.96 g of NMP were added at the same temperature, and dissolved with stirring for the predetermined time to polymerize a polyamic acid. Thereto, 0.177 g (1.197 mmol) of phthalic anhydride (PA) was added and stirred for the prescribed time to obtain a polyimide precursor.

The above organic solvent was added to the polyimide precursor obtained above so that its solid content was 12.8 wt %, thereby preparing a polyimide precursor solution.

Reference Example 1: Preparation of s-BPDA-DPDA/ODA (98.9:95:5) Polyimide Precursor A reactor subjected to nitrogen gas flow was filled with 100 g of organic solvent, DMPA, and then 5.863 g (54.215 mmol) of p-phenylene diamine (p-PDA) and 0.571 g (2.853 mmol) of 4,4'-oxydianiline (ODA) were dissolved therein while maintaining the temperature of the reactor at 25° C. To the solution of p-PDA and ODA, 16.606 g (56.440 mmol) of 3,3',4,4'-biphenylcarboxylic dianhydride (s-BPDA) and 56.96 g of NMP were added at the same temperature, and dissolved with stirring for the prescribed time to obtain a polyimide precursor.

The above organic solvent was added to the polyimide precursor obtained above so that its solid content was 12.8 wt %, thereby preparing a polyimide precursor solution.

Reference Example 2: Preparation of s-BPDA-DPDA/ODA (98.9:95:5) Polyimide Precursor A reactor subjected to nitrogen gas flow was filled with 100 g of organic solvent, DMPA, and then 5.843 g (54.034 mmol) of p-phenylene diamine (p-PDA) and 0.646 g (2.844 mmol) of 4,4'-diaminobenzanilide (4,4'-DABA) were dissolved therein while maintaining the temperature of the reactor to 25° C. To the solution of p-PDA and 4,4'-DABA, 16.550 g (56.252 mmol) of 3,3',4,4'-biphenylcarboxylic dianhydride (s-BPDA) and 56.96 g of NMP were added at the same temperature, and dissolved with stirring for the predetermined time to obtain a polyimide precursor.

The above organic solvent was added to the polyimide precursor obtained above so that its solid content was 12.8 wt %, thereby preparing a polyimide precursor solution.

Experimental Example 1

Each of the polyimide precursor solution prepared in Examples and Comparative Examples was measured for dynamic residual stress and Coefficient of Thermal Expansion (CTE) by the following methods, and the results are shown in Table 2.

1) Evaluation of Residual Stress

The polyimide precursor solution was spin coated in a thickness of 6 μm onto a 4-inch silicon wafer having a thickness of 525 μm±45 μm, in which the silicon wafer was measured in advance for its bow using a residual stress measurement device (Model FLX-2320, KLA-Tencor Corp.). The bow degree of the polyimide-coated wafer was measured using the residual stress measurement device while the polyimide-coated wafer was cured by heating at a rate of 6° C./min within the temperature range of 100-500° C. in a hot plate of the residual stress measurement device, followed by cooling, and the residual stress while temperature increases was evaluated. The results are shown in Table 2. Also, FIGS. 1 and 2 show graphs of residual stress variations measured for samples prepared using the polyimide precursor solution of Example 1 and Comparative Example 1.

2) Coefficient of Thermal Expansion (CTE)

The polyimide precursor solution was spin coated on a glass substrate. The polyimide precursor solution-coated glass substrate was subject to heating a rate of 6° C./min in an oven and maintained for 10 minutes at 120° C. and for 55 minutes at 460° C. for curing. After curing, the glass substrate was dipped in water to detach the film formed on the glass substrate. The detached film was dried in an oven set to 100° C. to prepare a 6 μm-thick polyimide film. The film was cut into a size of 5 mm×20 mm, and a sample was loaded on a TMA (Q400 from TA Instruments) using an accessory. The actual measured length of the films was 16 mm, and the force pulling the film was set to 0.02 N. A first heating process was performed within the temperature ranging from 100° C. to 460° C. at a heating rate of 4° C./min and then the cooling process is performed within the temperature ranging from 460° C. to 100° C. at a cooling rate of 4° C./min.

Then, when each of the cooled samples was subject to heating within the temperature ranging from 100° C. to 460° C. at a rate of 5° C./min, the coefficient of thermal expansion was measured with TMA. The coefficients of thermal expansion measured within the above range of the temperature are shown in Table 2. Also, FIG. 2 shows the results of CTE variation and residual stress variation depending on temperature changes measured for films prepared using the polyimide precursor solution of Example 1 and Comparative Example 1.

TABLE 2

| | Composition | Solvent | Thickness (μm) | PI film CTE (ppm/° C.) @ 100~450° C. | Residual Stress (MPa) (σ) @ 350° C. | Residual Stress (MPa) (σ) @ 500° C. | Stress Variation (Δσ) @ 350~500° C. |
|---|---|---|---|---|---|---|---|
| Ex. 1 | BPDA-pPDA (98.9:100) | DMPA | 6 | 4.8 | −17.4 | −15.8 | 1.6 |
| Ex. 2 | BPDA-pPDA-PA (98.9:100:2.2) | DMPA | 6 | 5.3 | −19.6 | −18.7 | 0.9 |
| Ex. 3 | BPDA-pPDA-TFMB (98.9:95:5) | DMPA | 6 | 3.5 | −14.2 | −11.5 | 2.7 |
| Ex. 4 | BPDA-pPDA-TFMB (98.9:90:10) | DMPA | 6 | 2.0 | −13.3 | −11.4 | 2.9 |
| Ex. 5 | BPDA-pPDA-TFMB-PA (98.9:95:5:2.2) | DMPA | 6 | 4.2 | −17.0 | −15.9 | 1.1 |
| Ex. 6 | BPDA-pPDA-TFMB-PA (98.9:90:10:2.2) | DMPA | 6 | 3.7 | −15.0 | −13.7 | 1.3 |
| Com. Ex.1 | BPDA-pPDA (98.9:100) | NMP | 6 | −1.5 | −15.2 | −2.3 | 12.9 |
| Com. Ex.2 | BPDA-pPDA-TFMB (98.9:95:5) | NMP | 6 | −3.4 | −10.5 | 0.6 | 11.1 |
| Com. Ex.3 | BPDA-pPDA-TFMB (98.9:90:10) | NMP | 6 | −8.8 | −3.2 | 7.4 | 10.6 |
| Com. Ex.4 | BPDA-pPDA-TFMB-PA (98.9:95:5:2.2) | NMP | 6 | −1.7 | −16.2 | −1.8 | 14.4 |
| Com. Ex.5 | BPDA-pPDA-TFMB-PA (98.9:90:10:2.2) | NMP | 6 | −2.0 | −15.9 | −2.2 | 13.7 |
| Ref. Ex. 1 | BPDA-pPDA-ODA (98.9:95:5) | DMPA | 6 | −0.3 | −10.9 | −3.5 | 7.4 |
| Ref. Ex.2 | BPDA-pPDA-DABA (98.9:95:5) | DMPA | 6 | −3.1 | −12.7 | −2.8 | 9.9 |

From Table 2, the polyimide film of Examples 1 to 6 using DMPA which is an organic solvent having a positive value of Log P exhibited a stress variation of 3 or less at a temperature ranging from 350° C. to 500° C., while the polyimide film of Comparative Examples 1 to 5 using NMP which is an organic solvent having a negative value of Log P exhibited a stress variation of 10 or more at a temperature ranging from 350° C. to 500° C.

Meanwhile, the film of Reference Examples 1 and 2 using a diamine having a linker structure (e.g., —O— or —C(O)NH—) within an aromatic ring in addition to the skeleton of BPDA-PDA exhibited a stress variation greater than those of Examples at a temperature ranging from 350° C. to 500° C.

FIG. 1 shows the results of dynamic stress on time, measured for the polyimide film prepared in Example 1 using DMPA which is an organic solvent having a positive value of Log P. From the graph of FIG. 1, the polyimide film of the present invention exhibited a stress variation of 3 or less when it is subject to heating and cooling at a temperature ranging from 350 to 500° C., which does not undergo stress reversal due to residual stress.

Also, since the polyimide films prepared in Comparative Examples 1 to 5 using NMP having a negative value of Log P exhibited a negative CTE at a temperature ranging from 350° C. to 500° C., which mean the generation of shrinkage at the above temperature range. FIG. 2 shows the results of CTE variation and residual stress variation measured for films prepared using the polyimide precursor solution of Example 1 and Comparative Example 1. As shown in FIG. 2, the polyimide films prepared using DMPA undergo little variation of stress during heat treatment at a high temperature of 350° C. or higher. On the contrary, the films prepared using NMP undergo shrinkage due to a negative CTE behavior at a high temperature to occur stress reversal (which change the direction of stress) and deform an inorganic layer formed on the polyimide film, thereby generating cracks in the inorganic layer.

Accordingly, the polyimide films of the present invention has a stress variation of 3 or less and a positive value of CTE at a temperature ranging from 350 to 500° C., thereby effectively inhibiting the generation of cracks due to stress reversal when a layer of $SiO_c$ is formed on the polyimide film through a high temperature process of 350° C. or higher. For example, as shown in FIG. 3, an inorganic layer is formed by deposition at a high temperature of 350° C. or higher, and is accompanied by a high temperature process of 350° C. or higher, such as dehydrogenation process and an activation process, in manufacturing a TFT device. At this time, the polyimide films of the present invention do not undergo shrinkage or stress reversal even though an inorganic layer such as a buffer layer is formed by deposition at a high temperature of 350° C. or higher, thereby reducing the generation of cracks in the inorganic layer. This can solve damages of electrical properties which may be caused by the cracks, such as the recoverable residual image and the current decrease of a flexible display.

While the present invention has been particularly shown and described with reference to figures and embodiments thereof, it will be understood by those of ordinary skill in the art that the scope of the present invention is not limited thereby and that various changes and modifications may be made therein. Therefore, the actual scope of the present invention will be defined by the appended claims and their equivalents.

What is claimed is:

1. A polyimide film for a flexible display substrate comprising a polyimide, which has a thickness of 5 to 20 μm, and has a stress variation of 0 to 5, wherein the stress variation is a difference in values of residual stress at a temperature of 350° C. and at a temperature of 500° C. while the film on a silicon wafer is subject to heating and cooling at a temperature ranging from 350 to 500° C.

wherein the polyimide comprises an end-capped polyimide including a polymerization product of a diamine, an acid dianhydride and an end-capping agent, and the end capping agent is in an amount of 1 to 10 parts by weight based on 100 parts weight of the sum of the acid dianhydride and the diamine, wherein the polyimide film comprises a heat-cured product of a polyimide precursor solution comprising a polyimide precursor and an organic solvent having a positive value of LogP, and the organic solvent having a positive value of Log P comprises diethylpropionamide (DEPA), and wherein the polyimide has a repeat unit of formula 6 and a repeat unit of formula 6a:

[Formula 6]

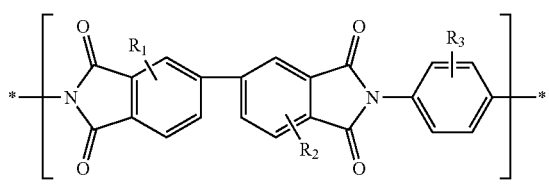

wherein, $R_1$, $R_2$ and $R_3$ are hydrogen atom;

[Formula 6a]

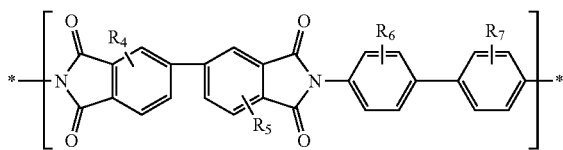

wherein, $R_4$ and $R_5$ are hydrogen atom and $R_6$ and $R_7$ are each independently $C_{1-10}$ fluoroalkyl, and wherein the repeat unit of formula 6 is formed from p-phenylene diamine (p-PDA), the repeat unit of formula 6a is formed from bis(trifluoromethyl)benzidine (TFMB), and a ratio of p-PDA to TFMB is 90:10 to 95:5.

2. The polyimide film for a flexible display substrate of claim 1, which has a positive value of Coefficient of Thermal Expansion at a temperature ranging from 350 to 500° C.

3. A flexible display substrate comprising the polyimide film of claim 1.

4. A method for preparing the polyimide film of claim 1, comprising:

adding polymeric components comprising the p-phenylene diamine, the bis(trifluoromethyl)benzidine, an acid dianhydride, and an end-capping agent to an organic solvent to prepare a polyimide precursor adding additional organic solvent e polyimide precursor to obtain a polyimide precursor solution, coating the polyimide precursor solution on a substrate, and curing the coating of the polyimide precursor solution by drying and heating thereof to prepare the polyimide film.

5. The polyimide film for a flexible display substrate of claim 1, wherein the Coefficient of Thermal Expansion is 0 to 10 ppm/° C.

6. The polyimide film for a flexible display substrate of claim 1, wherein the end capping agent is one or more dicarboxylic anhydrides selected from the group consisting of phthalic anhydride, 2,3-benzophenonedicarboxylic anhydride, 3,4-benzophenonedicarboxylic anhydride, 2,3-dicarboxyphenyl phenyl ether anhydride, 2,3-biphenyldicarboxylic anhydride, 3,4-biphenyldicarboxylic anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride, and 1,9-anthracenedicarboxylic anhydride.

7. The polyimide film for a flexible display substrate of claim 1, wherein the Coefficient of Thermal Expansion is 0 to 4.2 ppm/° C.

* * * * *